(12) United States Patent
Otsuka et al.

(10) Patent No.: US 10,662,303 B2
(45) Date of Patent: May 26, 2020

(54) STRETCHED FILM, METHOD FOR MANUFACTURING STRETCHED FILM, AND, POLYAMIDE RESIN COMPOSITION

(71) Applicant: Mitsubishi Gas Chemical Company, Inc., Tokyo (JP)

(72) Inventors: Kosuke Otsuka, Hiratsuka (JP); Tomonori Kato, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 65 days.

(21) Appl. No.: 15/743,973

(22) PCT Filed: Jul. 7, 2016

(86) PCT No.: PCT/JP2016/070081
§ 371 (c)(1),
(2) Date: Jan. 11, 2018

(87) PCT Pub. No.: WO2017/010390
PCT Pub. Date: Jan. 19, 2017

(65) Prior Publication Data
US 2018/0201744 A1    Jul. 19, 2018

(30) Foreign Application Priority Data
Jul. 16, 2015 (JP) .................. 2015-141872

(51) Int. Cl.
*C08J 5/18* (2006.01)
*C08G 69/26* (2006.01)
(Continued)

(52) U.S. Cl.
CPC ............. *C08J 5/18* (2013.01); *B29C 55/12* (2013.01); *C08G 69/26* (2013.01); *C08K 5/134* (2013.01); *C08L 77/06* (2013.01); *C08L 2203/16* (2013.01)

(58) Field of Classification Search
None
See application file for complete search history.

(56) References Cited

U.S. PATENT DOCUMENTS 4,024,115 A    5/1977    Zahn et al.
2002/0106523 A1    8/2002    Urabe et al.
(Continued)

FOREIGN PATENT DOCUMENTS

CN    1448422 A    10/2003
CN    102753339 A    10/2012
(Continued)

OTHER PUBLICATIONS

JP-07011131-A, Jan. 1995, Machine translation.*
(Continued)

*Primary Examiner* — Satya B Sastri
(74) *Attorney, Agent, or Firm* — Fitch, Even, Tabin & Flannery LLP

(57) ABSTRACT

Provided is a stretched film stretched stretchable to a high draw ratio a method for manufacturing the stretched film, and, a polyamide resin composition used for manufacturing the stretched film. The stretched film containing 0.5 to 15 parts by weight of a compound represented by Formula (1) per 100 parts by weight of a polyamide resin, wherein the polyamide resin is composed of a structural unit derived from diamine and a structural unit derived from dicarboxylic acid; 50% by mole or more of the structural unit derived from diamine is derived from xylylenediamine, and 50% by mole or more of the structural unit derived from dicarboxylic acid is derived from a straight-chain aliphatic amdicarboxylic acid having 4 to 20 carbon atoms: wherein $R^1$ represents an alkyl group having 1 to 10 carbon atoms, $R^2$ represents an alkyl group having 2 to 12 carbon atoms, and n represents an integer of 1 to 3.

(Continued)

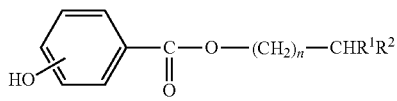

16 Claims, 2 Drawing Sheets

(51) Int. Cl.
  *C08L 77/06* (2006.01)
  *B29C 55/12* (2006.01)
  *C08K 5/134* (2006.01)

(56) References Cited

U.S. PATENT DOCUMENTS

| | | | |
|---|---|---|---|
| 2003/0190489 A1* | 10/2003 | Mitadera | B32B 27/34 428/474.4 |
| 2008/0020218 A1 | 1/2008 | Nanba | |
| 2011/0139258 A1* | 6/2011 | Doshi | B32B 27/34 137/1 |

FOREIGN PATENT DOCUMENTS

| | | | |
|---|---|---|---|
| CN | 103249765 A | | 8/2013 |
| EP | 1741553 A1 | | 1/2007 |
| EP | 2770026 A1 | | 8/2014 |
| JP | 07011131 A | * | 1/1995 |
| JP | H07-11131 A | | 1/1995 |
| JP | H07-157651 A | | 6/1995 |
| JP | 2001151887 A | * | 6/2001 |
| JP | 2002-309082 A | | 10/2002 |
| JP | 2003-160728 A | | 6/2003 |
| JP | 2006-321193 A | | 11/2006 |
| JP | 2009-234196 A | | 10/2009 |
| JP | 2013-514212 A | | 4/2013 |
| RU | 2273651 C1 | | 4/2006 |
| RU | 2301816 C2 | | 6/2007 |
| WO | 2006/049281 A1 | | 5/2006 |
| WO | 2011/084423 A1 | | 7/2011 |

OTHER PUBLICATIONS

JP-2001151887-A, Jun. 2001, Derwent Ab.*
Extended European Search Report issued in corresponding European Application No. 16824370.7 dated Feb. 15, 2019 (5 pages).
Office Action dated Jul. 18, 2019, in corresponding Russian Patent Application No. 2018105596.
Office Action dated Aug. 20, 2019, in corresponding Chinese Patent Application No. 201680040902.5.

* cited by examiner

STRETCHED FILM, METHOD FOR MANUFACTURING STRETCHED FILM, AND, POLYAMIDE RESIN COMPOSITION

CROSS-REFERENCE TO RELATED APPLICATIONS

This application is a U.S. national phase application filed under 35 U.S.C. § 371 of International Application PCT/JP2016/070081, filed on Jul. 7, 2016, designating the United States, which claims priority from Japanese Application Number 2015-141872, filed Jul. 16, 2015.

FIELD OF THE INVENTION

This invention relates to a stretched film, a method for manufacturing the stretched film, and, a polyamide resin composition.

BACKGROUND OF THE INVENTION

A polyamide resin having a diamine structural unit derived from xylylenediamine has widely been used owing to its low water absorption and high chemical resistance.

For example, Patent Literature 1 discloses a thermoplastic resin composition that includes (A) 5 to 90 parts by weight of a polyphenylene ether-based resin, (B) 95 to 10 parts by weight of a polyamide resin, and per 100 parts by weight in total of them, (C) 0.01 to 30 parts by weight of a compatibilizer, (D) 0.1 parts by weight to 100 parts by weight of a plasticizer that adds flexibility to polyamide, and (E) 0 to 100 parts by weight of a rubber-like substance. Patent Literature 1 further describes that such thermoplastic resin composition achieves both of flexibility and high tensile strength.

There has also been examined to use the polyamide resin having a diamine structural unit derived from xylylenediamine in the form of film.

For example, Patent Literature 2 describes an aromatic polyamide stretched film obtained by stretching an aromatic polyamide resin to a draw ratio exceeding 4 in the MD direction and/or TD direction, wherein the aromatic polyamide resin includes a diamine structural unit that contains 70% by mole or more of metaxylylenediamine unit; and a dicarboxylic acid structural unit that contains 80 to 97% by mole of a straight-chain aliphatic α,ω-dicarboxylic acid unit having 4 to 20 carbon atoms, and 3 to 20% by mole of an isophthalic acid unit, wherein the aromatic polyamide resin shows a shortest semicrystallization time of 40 to 2000 seconds, when measured by the depolarization intensity measurement under isothermal crystallization, within a measurement temperature range from the glass transition point or above and below the melting point.

Patent Literature 3 discloses a multi-layered structure including A) a polyamide layer made from a polyamide composition, and B) a barrier layer made from ethylene-vinyl alcohol copolymer (EVOH), the polyamide layer being directly adhered to the barrier layer, wherein the polyamide composition contains one or plural species of semi-aromatic copolyamides selected from copolyamides manufactured from a) Group A monomer selected from i) aromatic dicarboxylic acid having 8 to 20 carbon atoms and aliphatic diamine having 4 to 20 carbon atoms, or ii) aliphatic dicarboxylic acid having 6 to 20 carbon atoms and aromatic diamine having 6 to 20 carbon atoms, or iii) aromatic aminocarboxylic acid having 7 to 20 carbon atoms; and b) Group B monomer selected from iv) aliphatic dicarboxylic acid having 6 to 20 carbon atoms and aliphatic diamine having 4 to 20 carbon atoms, or v) lactam and/or aliphatic aminocarboxylic acid having 4 to 20 carbon atoms, and wherein the Group A monomer accounts for approximately 10 mol percent to approximately 40 mol percent based on the copolyamide, and the Group B monomer accounts for approximately 60 mol percent to approximately 90 mol percent based on the copolyamide.

Meanwhile, Patent Literature 4 discloses a polyamide resin composition obtained by blending, per 100 parts by weight of a polyamide resin selected from polyamide 11, polyamide 12 and mixture of them, (A) 2 to 60 parts by weight of a compound represented by Formula (1),

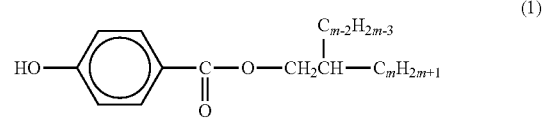

(in Formula, m represents an integer of 7 or larger and 10 or smaller.) and (B) 0.05 to 5 parts by weight of monohydric alcohol having 16 to 24 carbon atoms and having a branched chain.

CITATION LIST

Patent Literatures

[Patent Literature 1] JP-A-H07-157651
[Patent Literature 2] International Publication WO2006/049281, Pamphlet
[Patent Literature 3] JP-T2-2013-514212
[Patent Literature 4] JP-A-H07-11131

SUMMARY OF THE INVENTION

However, in some cases, the polyamide resin film having the diamine structural unit derived from xylylenediamine cannot be stretched to a high draw ratio, making it unstretchable when laminated with other resin film. For example, when stretched together with a resin film stretchable to a high raw ratio, such as polypropylene resin film, the polyamide resin film would be broken.

The present invention is aimed to solve such problem, and the object of which is to provide a stretched film, and in particular a stretched film stretchable to a high draw ratio. The present invention is also to provide a method for manufacturing the stretched film, and, a polyamide resin composition used for manufacturing the stretched film.

Considering the problem, the present inventors found after thorough investigations that a film using a polyamide resin composition, which is obtained by blending a predetermined polyamide resin and a predetermined amount of plasticizer, was stretchable to a high draw ratio, which led us to reach this invention. More specifically, the above-described problem was solved by means below:

<1> A stretched film containing 0.5 to 15 parts by weight of a compound represented by Formula (1) per 100 parts by weight of a polyamide resin, wherein the polyamide resin is composed of a structural unit derived from diamine and a structural unit derived from dicarboxylic acid; 50% by mole or more of the structural unit derived from diamine is derived from xylylenediamine, and 50% by mole or more of the structural unit derived from dicarboxylic acid is derived from a straight-chain aliphatic am-dicarboxylic acid having 4 to 20 carbon atoms:

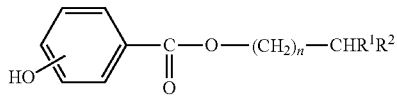

Formula (1)

wherein $R^1$ represents an alkyl group having 1 to 10 carbon atoms, $R^2$ represents an alkyl group having 2 to 12 carbon atoms, and n represents an integer of 1 to 3.
<2> The stretched film of <1>, wherein the xylylenediamine comprises 30 to 100% by mole of metaxylylenediamine and 0 to 70% by mole of paraxylylenediamine.
<3> The stretched film of <1> or <2>, wherein 50% by mole or more of the structural unit derived from dicarboxylic acid is derived from at least one of sebacic acid and adipic acid.
<4> The stretched film of any one of <1> to <3>, wherein 50% by mole or more of the structural unit derived from dicarboxylic acid is derived from adipic acid.
<5> The stretched film of any one of <1> to <4>, wherein the stretched film has a phosphorus atom concentration of 0.1 to 10 ppm.
<6> The stretched film of any one of <1> to <5>, wherein in the compound represented by Formula (1), $R^1$ represents an alkyl group having 3 to 7 carbon atoms, and $R^2$ represents an alkyl group having 5 to 9 carbon atoms.
<7> The stretched film of any one of <1> to <6>, which has the final draw ratio of 20.0 or larger.
<8> The stretched film of any one of <1> to <7>, which has a tensile modulus, measured according to JIS K7127, of 2.0 GPa or larger.
<9> The stretched film of any one of <1> to <8>, which has a thickness of 1 to 100 μm.
<10> A method for manufacturing a stretched film, the method comprising stretching a film consisting of a polyamide resin composition, wherein the polyamide resin composition contains 0.5 to 15 parts by weight of a compound represented by Formula (1) per 100 parts by weight of a polyamide resin, the polyamide resin is composed of a structural unit derived from diamine and a structural unit derived from dicarboxylic acid,
50% by mole or more of the structural unit derived from diamine is derived from xylylenediamine, and 50% by mole or more of the structural unit derived from dicarboxylic acid is derived from a straight-chain aliphatic am-dicarboxylic acid having 4 to 20 carbon atoms: Formula (1)

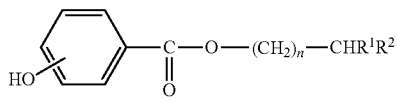

Formula (1)

wherein $R^1$ represents an alkyl group having 1 to 10 carbon atoms, $R^2$ represents an alkyl group having 2 to 12 carbon atoms, and n represents an integer of 1 to 3.
<11> The method for manufacturing a stretched film of <10>, wherein the film is stretched in two orthogonal directions.
<12> The method for manufacturing a stretched film of <10>, wherein the film is stretched in two orthogonal directions respectively to a draw ratio of 4.2 or larger.
<13> The method for manufacturing a stretched film of any one of <10> to <12>, wherein the stretching temperature is not lower than (melting point of the polyamide resin −200° C.), and lower than the melting point of the polyamide resin.
<14> The method for manufacturing a stretched film of any one of <10> to <13>, wherein the film is stretched to a total draw ratio of 18.0 or larger.
<15> A polyamide resin composition used for manufacturing a stretched film, the composition containing 0.5 to 15 parts by weight of a compound represented by Formula (1) per 100 parts by weight of a polyamide resin, wherein the polyamide resin is composed of a structural unit derived from diamine and a structural unit derived from dicarboxylic acid; 50% by mole or more of the structural unit derived from diamine is derived from xylylenediamine, and 50% by mole or more of the structural unit derived from dicarboxylic acid is derived from a straight-chain aliphatic α,ω-dicarboxylic acid having 4 to 20 carbon atoms:
Formula (1)

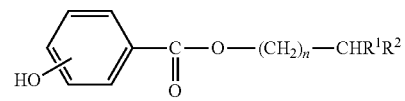

Formula (1)

wherein $R^1$ represents an alkyl group having 1 to 10 carbon atoms, $R^2$ represents an alkyl group having 2 to 12 carbon atoms, and n represents an integer of 1 to 3.
According to this invention, it became possible to provide a stretched film stretchable to a high draw ratio, a method for manufacturing the stretched film, and, a polyamide resin composition.

DESCRIPTION OF EMBODIMENTS

Figure 1:
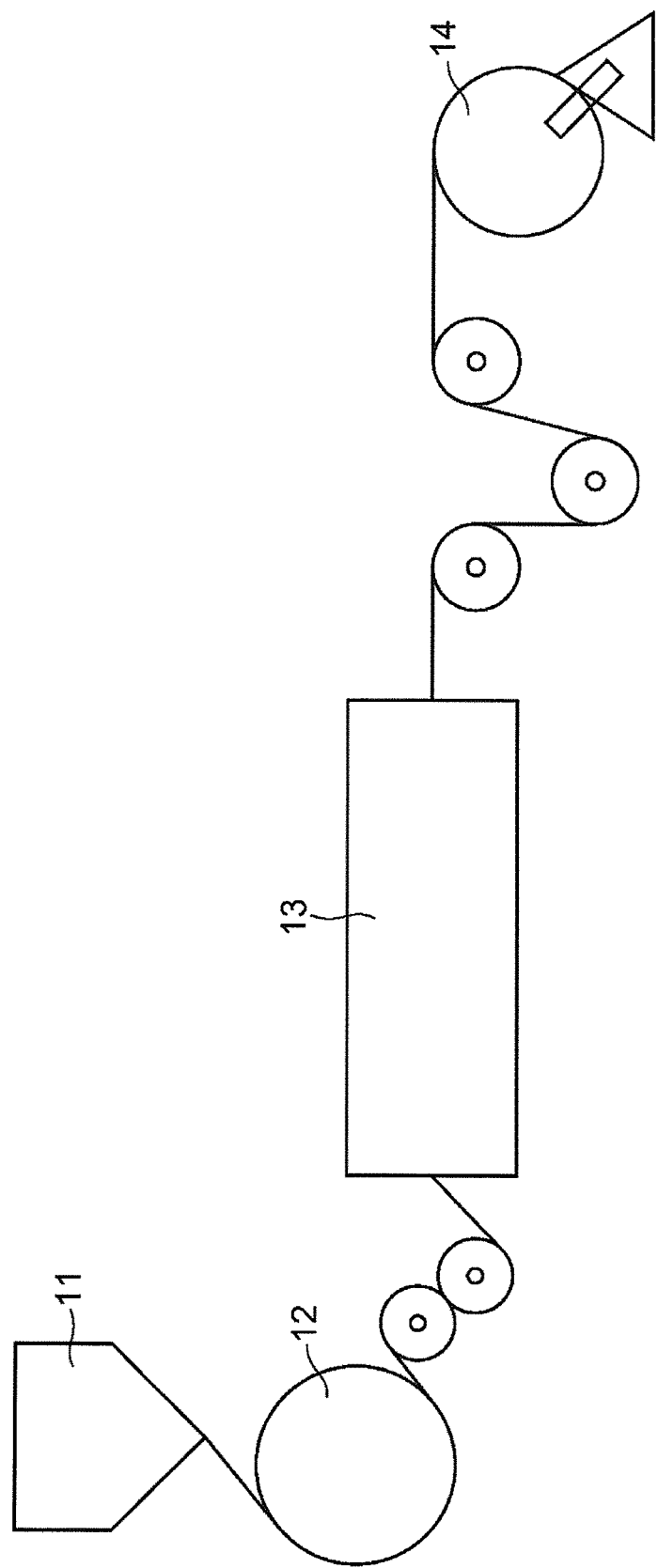
FIG. 1 is a schematic drawing illustrating an exemplary process of manufacturing a stretched film of this invention.

This invention will be detailed below. Note that all numerical ranges in this specification given using "to", placed between numerals, mean the ranges containing both numerals as the lower and upper limits. In this specification, ppm means ppm by weight.
Stretched Film
The stretched film of this invention is characterized in that it contains 0.5 to 15 parts by weight of a compound represented by Formula (1) per 100 parts by weight of a polyamide resin, the polyamide resin includes a structural unit derived from diamine and a structural unit derived from dicarboxylic acid, 50% by mole or more of the structural unit derived from diamine is derived from xylylenediamine, and 50% by mole or more of the structural unit derived from dicarboxylic acid is derived from a straight-chain aliphatic am-dicarboxylic acid having 4 to 20 carbon atoms (occasionally referred to as "XD-based polyamide resin", hereinafter). With such configuration, the resultant stretched film will be stretchable to a high draw ratio. Accordingly, it now becomes possible to obtain a stretched film that can be laminated with a resin film stretched to a high draw ratio.
Formula (1)

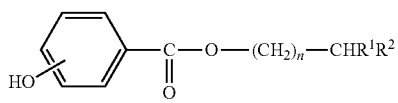

Formula (1)

In Formula (1), $R^1$ represents an alkyl group having 1 to 10 carbon atoms, $R^2$ represents an alkyl group having 2 to 12 carbon atoms, and n represents an integer of 1 to 3.

Blending of a plasticizer, such as the compound represented by Formula (1), to the polyamide resin is described for example in Patent Literature 1 and Patent Literature 4. The present inventors, however, found from our investigations that the compound represented by Formula (1) showed different behaviors depending on species of the polyamide resin. It was surprisingly made possible to stretch the polyamide resin film to a high draw ratio, as a result of blending of a predetermined ratio of the compound represented by Formula (1), to the XD-based polyamide resin.

More specifically, the polyamide resin, when added with a plasticizer, such as the compound represented by Formula (1), usually tends to lower its crystallization temperature during temperature elevation. Lowered crystallization temperature makes the resin more crystallizable, increases the stretching stress, and usually makes stretching difficult. Also the XD-based polyamide resin, blended with the compound represented by Formula (1), was found to lower the crystallization temperature during temperature elevation, and to increase the stretching stress. However, when blended with the compound represented by Formula (1), the polyamide resin configured based on the combination of the XD-based polyamide resin and the compound represented by Formula (1) was found to be stretchable easily and to a higher draw ratio, despite increased in the stretching stress. Although the principle remains in speculation, a proper level of stretching stress applied under the presence of the compound represented by Formula (1) supposedly relaxed strain in the molecular chain which can originate rupture during stretching, and this could increase the draw ratio than under the absence of the compound.

This invention will be detailed below.

The stretched film of this invention is obtained by stretching a film (polyamide resin film) that is made of a polyamide resin composition containing 0.5 to 15 parts by weight of the compound represented by Formula (1) per 100 parts by weight of the XD-based polyamide resin. The polyamide resin composition of this invention will be detailed below.

<XD-Based Polyamide Resin>

The XD-based polyamide resin used as an essential component in this invention is composed of a structural unit derived from diamine and a structural unit derived from dicarboxylic acid, wherein 50% by mole or more of the structural unit derived from diamine is derived from xylylenediamine, and 50% by mole or more of the structural unit derived from dicarboxylic acid is derived from a straight-chain aliphatic α,ω-dicarboxylic acid having 4 to 20 carbon atoms.

In the XD-based polyamide resin, preferably 70% by mole or more, more preferably 80% by mole or more, and even more preferably 90% by mole or more of the structural unit derived from diamine is derived from at least one species of xylylenediamine; and preferably 70% by mole or more, more preferably 80% by mole or more, and particularly 90% by mole or more of the structural unit derived from dicarboxylic acid is derived from at least one species of straight-chain aliphatic α,ω-dicarboxylic acid preferably having 4 to 20 carbon atoms.

The diamine component, which is an ingredient for the XD-based polyamide resin contains 70% by mole or more of metaxylylenediamine, wherein the content is more preferably 80% by mole or more, and even more preferably 90% by mole or more. The diamine component with the metaxylylenediamine content adjusted to 70% by mole or more, the obtainable polyamide resin will have an excellent gas barrier performance.

More specifically, the xylylenediamine is preferably composed of 30 to 100% by mole of metaxylylenediamine and 0 to 70% by mole of paraxylylenediamine, and more preferably composed of 70 to 100% by mole of metaxylylenediamine and 0 to 30% by mole of paraxylylenediamine.

Examples of diamines other than xylylenediamine, which may be used as a source diamine component for the XD-based polyamide resin, include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic rings such as bis(4-aminophenyl)ether, paraphenylenediamine, and bis(aminomethyl)naphthalene, which may be used independently, or as a mixture of two or more species.

When the diamine other than xylylenediamine is used as the diamine component, the ratio of use is 30% by mole or less of the structural unit derived from diamine, preferably 1 to 25% by mole, and particularly 5 to 20% by mole.

The straight-chain aliphatic α,ω-dicarboxylic acid having 4 to 20 carbon atoms, preferably used as the source dicarboxylic acid component for the XD-based polyamide resin is preferably straight-chain aliphatic α,ω-dicarboxylic acid having 6 to 16 carbon atoms, and more preferably straight-chain aliphatic α,ω-dicarboxylic acid having 6 to 10 carbon atoms. The straight-chain aliphatic α,ω-dicarboxylic acid having 4 to 20 carbon atoms is exemplified by aliphatic dicarboxylic acids such as succinic acid, glutaric acid, pimelic acid, suberic acid, azelaic acid, adipic acid, sebacic acid, undecanedioic acid, and dodecanedioic acid, which may be used independently, or as a mixture of two or more species. Among them, at least one of adipic acid and sebacic acid is preferable, in view of controlling the melting point of the polyamide resin suitable for molding or working. Adipic acid is particularly preferable.

The dicarboxylic acid component other than the straight-chain aliphatic α,ω-dicarboxylic acid having 4 to 20 carbon atoms is exemplified by phthalic acid compounds such as isophthalic acid, terephthalic acid, and orthophthalic acid; and naphthalenedicarboxylic acids including isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid, which may be used independently, or as a mixture of two or more species.

When the dicarboxylic acid other than the straight-chain aliphatic α,ω-dicarboxylic acid having 4 to 20 carbon atoms is used as the dicarboxylic acid component, it is preferable to use terephthalic acid or isophthalic acid, taking the moldability or workability, and barrier performance into consideration. Ratio of terephthalic acid or isophthalic acid is preferably 30% by mole or less of the structural unit derived from dicarboxylic acid, more preferably in the range from 1 to 30% by mole, and particularly from 5 to 20% by mole.

Now, the phrase stating that "composed of the structural unit derived from diamine and the structural unit derived from dicarboxylic acid" means that the amido bond composing the XD-based polyamide resin is formed by a bond between dicarboxylic acid and diamine. The XD-based polyamide resin contains other moieties such as terminal groups, besides the structural unit derived from dicarboxylic acid and the structural unit derived from diamine. It could even contain a repeating unit whose amido bond is not attributable to the bond between dicarboxylic acid and diamine, and a trace amount of impurity. More specifically, the XD-based polyamide resin may employ lactams such as ε-caprolactam and laurolactam, or aliphatic aminocarboxylic acids such as aminocaproic acid and aminoundecanoic acid, as the copolymerizable components constituting the polyamide resin, besides the diamine component and the dicarboxylic acid component, without adversely affecting the effects of this invention. In this invention, the structural unit derived from diamine or structural unit derived from dicarboxylic acid preferably accounts for 90% by weight or more of the XD-based polyamide resin.

The XD-based polyamide resin used in this invention preferably has a phosphorus atom concentration of 0.1 to 10 ppm, and more preferably 1 to 8 ppm. Within these ranges, not only the film is prevented from yellowing, but also concurrently the continuous productivity is improved as a result of suppressed clogging of a polymer filter, and thereby the effects of this invention will be demonstrated more efficiently.

As detailed later, the stretched film used in this invention preferably has the phosphorus atom concentration within a predetermined range, and such phosphorus atom is, in most cases, attributable to the polyamide resin.

The XD-based polyamide resin used in this invention preferably has a number-average molecular weight (Mn) of 6,000 to 30,000, more preferably 8,000 to 28,000, and even more preferably 9,000 to 26,000. Within these ranges, the moldability or workability will further be improved.

The number-average molecular weight (Mn) in this context is calculated from the equation below, using terminal amino group concentration [NH$_2$] (microequivalent/g) and terminal carboxy group concentration [COOH] (microequivalent/g) of the polyamide resin:

Number-average molecular weight (Mn)=2,000,000/ ([COOH]+[NH$_2$])

The XD-based polyamide resin used in this invention preferably has a polydispersity (weight-average molecular weight/number-average molecular weight (Mw/Mn)) of 1.8 to 3.1. The polydispersity is more preferably 1.9 to 3.0, and even more preferably 2.0 to 2.9. With the polydispersity controlled within these ranges, a composite material with excellent mechanical properties will more likely be obtained.

The polydispersity of the XD-based polyamide resin is controllable by properly selecting, for example, types and amounts of initiator and catalyst used for polymerization, and polymerization conditions such as reaction temperature, pressure and time. It is alternatively controllable by mixing two or more types of XD-based polyamide resins with different average molecular weights obtained under different polymerization conditions, or by subjecting the polymerized XD-based polyamide resin to fractional precipitation.

The polydispersity may be determined by GPC measurement, and may more specifically be given as standard polymethyl methacrylate (PMMA) equivalent values, through measurement by using "HLC-8320GPC" from TOSOH Corporation as an instrument, two sets of "TSKgel Super HM-H" from TOSOH Corporation as columns, and a 10 mmol/l sodium trifluoroacetate solution in hexafluoroisopropanol (HFIP) as an eluent; conducted at a resin concentration of 0.02% by weight, a column temperature of 40° C. and a flow rate of 0.3 ml/min; and using a refractive index detector (RI). The analytical curve is prepared by dissolving PMMA in HFIP, at six levels of concentration.

The XD-based polyamide resin suitably employed here has a terminal amino group concentration ([NH$_2$]) of preferably less than 100 microequivalent/g, more preferably 5 to 75 microequivalent/g, and even more preferably 10 to 60 microequivalent/g; and a terminal carboxy group concentration ([COOH]) of preferably less than 150 microequivalent/g, more preferably 10 to 120 microequivalent/g, and even more preferably 10 to 100 microequivalent/g. By using the XD-based polyamide resin with such terminal group concentrations, the XD-based polyamide resin will be more likely to show a stabilized viscosity during forming into film-like article or film-like article, and will more likely be reactive with a carbodiimide compound described later.

Those having a ratio of the terminal amino group concentration relative to the carboxy group concentration ([NH$_2$]/[COOH]) of 0.7 or smaller are preferable, which is more preferably 0.6 or smaller, and particularly 0.5 or smaller. Those having the ratio exceeding 0.7 may occasionally be difficult to control the molecular weight, in the process of polymerizing the XD-based polyamide resin.

The terminal amino group concentration may be determined by dissolving 0.5 g of the XD-based polyamide resin into 30 ml of phenol/methanol (4:1) mixed solution at 20 to 30° C. under stirring, and then titrating the solution with a 0.01 N hydrochloric acid. Meanwhile, the terminal carboxy group concentration may be determined by dissolving 0.1 g of the XD-based polyamide resin into 30 ml of benzyl alcohol at 190° C., cooling the mixture on a water bath at 40° C., and then titrating the mixture with a 0.01 N potassium hydroxide solution.

As for a method for manufacturing the XD-based polyamide resin, the description in paragraphs [0052] and [0053] of JP-A-2014-173196 may be referred to, the contents of which are incorporated into this specification.

In this invention, the XD-based polyamide resin preferably has a melting point of 150 to 350° C., which is more preferably 180 to 300° C., and even more preferably 180 to 250° C.

The XD-based polyamide resin preferably has a glass transition point of 50 to 100° C., which is more preferably 55 to 100° C., and particularly 60 to 100° C. Within these ranges, the resin will have an improved heat resistance.

The melting point in this invention means a temperature at which an endothermic peak becomes deepest (peak top) in DSC (differential scanning calorimetry) during a heating process, and is more specifically a value obtained by measurement according to the method described later in EXAMPLES. If the measuring instrument described later in EXAMPLES is no more available typically because the production has been discontinued, any other equivalent instrument may be employed for the measurement. The same will apply also to other methods of measuring.

The glass transition temperature is measured after once heating and melting a sample so as to cancel any influences of the thermal history on the crystallinity, and by heating the sample again. The measurement may be conducted typically by using "DSC-60" from Shimadzu Corporation, approximately 5 mg of the sample, and nitrogen as an atmospheric gas fed at a flow rate of 30 ml/min, wherein the polyamide resin is melted under heating at a heating rate of 10° C./min from room temperature up to a temperature above a predicted melting point, rapidly cooled on dry ice, and re-heated up to a temperature above the melting point at a heating rate of 10° C./min, to determine the glass transition point.

The lower limit of crystallization temperature of the XD-based polyamide resin during heating is preferably 50° C. or above, more preferably 80° C. or above, even more preferably 100° C. or above, particularly 120° C. or above, and yet more preferably 140° C. or above. The upper limit of crystallization temperature of the XD-based polyamide resin during heating is preferably 180° C. or below, more preferably 170° C. or below, even more preferably 162° C. or below, particularly 155° C. or below, and yet more preferably 148° C. or below.

The XD-based polyamide resin used in this invention, when blended with 5% by weight of the compound represented by Formula (1), preferably shows a crystallization temperature, during heating, lower than that of a resin not blended with the compound represented by Formula (1), wherein the difference is preferably 3° C. or larger, more preferably 5° C. or larger, and particularly 10° C. or larger. Although the upper limit of the difference of crystallization temperature during heating is not specifically limited, it may typically be 40° C. or smaller, also be 35° C. or smaller, and particularly be 30° C. or smaller.

A method for measuring the crystallization temperature during heating follows the description later in EXAMPLES.

The ratio of the XD-based polyamide resin in the polyamide resin composition of this invention is 50% by weight or more, preferably 60% by weight or more, even more preferably 70% by weight or more, and may also be 80% by weight or more.

<Other Polyamide Resin>

The polyamide resin composition of this invention may also contain a polyamide resin other than the above-described XD-based polyamide resin. Such other polyamide resin is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyamide 9T, polyamide 9MT, and polyamide 6I/6T. Among such other polyamide resins, when contained, at least one of polyamide 6 and polyamide 66 is preferable.

The content of such other polyamide resin, when blended, in the polyamide resin composition of this invention is preferably 1 to 50 parts by weight per 100 parts by weight of the XD-based polyamide resin, and more preferably 5 to 40 parts by weight.

<Compound Represented By Formula (1)>

The polyamide resin composition of this invention contains the compound represented by Formula (1).

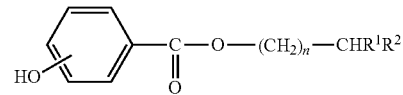

In Formula (1), $R^1$ represents an alkyl group having 1 to 10 carbon atoms, $R^2$ represents an alkyl group having 2 to 12 carbon atoms, and n represents an integer of 1 to 3.

In the compound represented by Formula (1), the moiety of OH group is presumed to improve affinity with the XD-based polyamide resin. The moiety of OH group may substitute at any of the ortho, meta and para positions, wherein the para position is more preferable.

In the compound represented by Formula (1), the group represented by $-(CH_2)_n-$ is presumed to serve as a linking group that combines the hydroxyphenyl ester group and $-CR^1R^2$. n Is preferably 1 or 2, and more preferably 1.

In the compound represented by Formula (1), $-CR^1R^2$ is presumed to serve as a moiety that enhances the compatibility with the XD-based polyamide resin.

In the compound represented by Formula (1), $R^1$ is preferably an alkyl group having 1 to 9 carbon atoms, more preferably an alkyl group having 2 to 9 carbon atoms, even more preferably an alkyl group having 2 to 8 carbon atoms, particularly an alkyl group having 3 to 7 carbon atoms, and yet more preferably an alkyl group having 4 to 6 carbon atoms. The alkyl group represented by $R^1$ is preferably a straight-chain or branched alkyl group, and is more preferably a straight-chain alkyl group.

In the compound represented by Formula (1), $R^2$ preferably represents an alkyl group having 2 to 10 carbon atoms, more preferably an alkyl group having 3 to 9 carbon atoms, even more preferably an alkyl group having 5 to 9 carbon atoms, and particularly an alkyl group having 6 to 8 carbon atoms. The alkyl group represented by $R^2$ is preferably a straight-chain or branched alkyl group, and is more preferably a straight-chain alkyl group.

In this invention, in the compound represented by Formula (1), $R^2$ preferably has two or more, and more preferably two to four more carbon atoms than $R^1$. With such configuration, the effects of this invention will be demonstrated more effectively.

Examples of the compound represented by Formula (1) will be shown below. This invention is however of course not limited thereto:

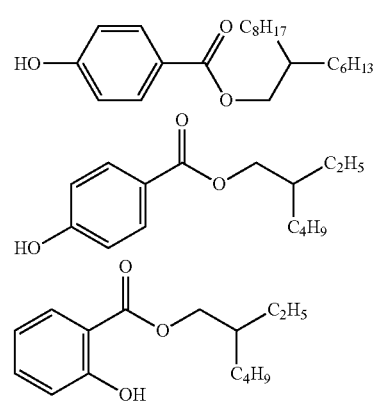

In the polyamide resin composition, 0.5 to 15 parts by weight of the compound represented by Formula (1) is contained per 100 parts by weight of the polyamide resin. The lower limit of the content of the compound represented by Formula (1) is preferably 0.6 parts by weight or above, more preferably 0.7 parts by weight or above, even more preferably 0.8 parts by weight or above, and particularly 0.9 parts by weight or above. The upper limit is preferably 15 parts by weight or below, more preferably 11 parts by weight or below, even more preferably 10 parts by weight or below, yet more preferably 8 parts by weight or below, further preferably 6 parts by weight or below, and again further preferably 4 parts by weight or below.

Only a single species, or two or more species of the compounds represented by Formula (1) may be used. When two or more species are contained, the total content preferably falls within the above-described ranges.

In particular, in this invention, oxygen barrier performance may further be improved, when 0.5 to 4 parts by weight, and particularly 0.8 to 2.0 parts by weight of the compound is blended per 100 parts by weight of the polyamide resin in which 50% by mole or more of the structural unit derived from dicarboxylic acid is derived from adipic acid.

The polyamide resin composition of this invention may contain one, or two or more species of other plasticizers other than the compound represented by Formula (1). Such other plasticizers are exemplified by the plasticizers described in paragraph [0039] of JP-A-H07-11131, the content of which is incorporated into this specification. It is, however, preferable to compose the polyamide resin composition of this invention, so as to contain substantially no plasticizer other than the compound represented by Formula (1). The phrase stating that "to contain substantially no . . . " means, for example, that the content of such other plasticizer in the polyamide resin composition of this invention is 0.1% by weight or less of the weight of the compound represented by Formula (1).

<Other Resin Component>

The polyamide resin composition of this invention may contain other resin component other than the polyamide resin. Such other resin component other than the polyamide resin is exemplified by polyolefin resins such as polyethylene and polypropylene; polyester resins such as polyethylene terephthalate and polybutylene terephthalate; and thermoplastic resins such as polycarbonate resin, polyoxymethylene resin, polyether ketone, polyethersulfone, and thermoplastic polyether.

The polyamide resin composition of this invention may also be configured to contain substantially no thermoplastic resin other than the polyamide resin. The phrase stating that "to contain substantially no . . . " means, for example, that the content of the thermoplastic resin other than the polyamide resin in the polyamide resin composition of this invention is 5% by weight or less of the weight of the polyamide resin.

<Other Additives>

The polyamide resin composition of this invention may additionally contain additives such as antioxidant, stabilizers such as heat stabilizer, hydrolysis modifier, weathering stabilizer, matting agent, UV absorber, nucleating agent, plasticizer, dispersion aid, flame retarder, antistatic agent, anti-coloring agent, antigelling agent, colorant, and mold releasing agent, within the range the objects and effects of this invention will not be adversely affected. Regarding details of these additives, the description in paragraphs [0130] to [0155] of JP-B1-4894982 may be referred to, the contents of which are incorporated into this specification.

The polyamide resin composition is, however, preferably such that the XD-based polyamide resin and the compound represented by Formula (1) collectively account for 80% by weight or more of the total, and more preferably 90% by weight or more.

Although the polyamide resin composition of this invention may contain a filler such as carbon fiber, it preferably contains substantially no filler. The phrase stating that "contains substantially no . . . " means, for example, that the amount of blending of the filler is 3% by weight or less of the polyamide resin composition of this invention.

The polyamide resin composition of this invention is preferably used for manufacturing a stretched film as described above.

<Properties of Polyamide Resin Composition>

The polyamide resin composition of this invention, in particular, a film (unstretched film) composed of the polyamide resin composition before being stretched, preferably satisfies the properties below.

The polyamide resin composition of this invention preferably has a melting point of 150 to 350° C., more preferably 180 to 300° C., and even more preferably 180 to 250° C.

The lower limit of the crystallization temperature of the polyamide resin composition of this invention during heating is preferably 50° C. or above, more preferably 80° C. or above, even more preferably 100° C. or above, and particularly 120° C. or above. The upper limit of the crystallization temperature of the polyamide resin composition of this invention during heating is preferably 180° C. or below, more preferably 170° C. or below, even more preferably 162° C. or below, particularly 155° C. or below, and further preferably 148° C. or below.

The polyamide resin composition of this invention blended with 5% by weight of the compound represented by Formula (1) preferably shows the crystallization temperature during heating, lower than the crystallization temperature during heating shown by the polyamide resin not blended with the compound represented by Formula (1), wherein the difference is preferably 3° C. or larger, and more preferably 5° C. or larger. Although the difference of crystallization temperature during heating is not specifically limited, it may typically be 40° C. or smaller, further may be 35° C. or smaller, and may particularly be 10° C. or smaller.

Properties of Stretched Film

The stretched film of this invention may be a high-draw-ratio stretched film. The stretched film of this invention preferably has the final MD draw ratio and the final TD draw ratio of 4.2 or larger respectively and independently, more preferably 4.4 or larger, even more preferably 4.6 or larger, yet more preferably 4.8 or larger, and may even be 7.0 or larger particularly when the polyamide resin in which 50% by mole or more of the structural unit derived from dicarboxylic acid is derived from sebacic acid, is used. Although the upper limits of the final MD draw ratio and the final TD draw ratio are not specifically limited, ratios of 5.8 or smaller are acceptable as a practical level, which are typically attained by the polyamide resin in which 50% by mole or more of the structural unit derived from dicarboxylic acid is derived from adipic acid. Also ratios of 8.0 or smaller are acceptable as a practical level, which are typically attained by the polyamide resin in which 50% by mole or more of the structural unit derived from dicarboxylic acid is derived from sebacic acid.

The stretched film of this invention preferably has a final draw ratio of 20.0 or larger, more preferably 21.0 or larger, even more preferably 23.0 or larger, yet more preferably 24.0 or larger, particularly 24.5 or larger, and may even be 55 or larger particularly when the polyamide resin, in which 50% by mole or more of the structural unit derived from dicarboxylic acid is derived from sebacic acid, is used. Although the upper limit of the final draw ratio is not specifically limited, a ratio of 30 or smaller is acceptable as a practical level, which is typically attained by the polyamide resin in which 50% by mole or more of the structural unit derived from dicarboxylic acid is derived from adipic acid. Also a ratio of 80 or smaller is acceptable as a practical level, which is typically attained by the polyamide resin in which 50% by mole or more of the structural unit derived from dicarboxylic acid is derived from sebacic acid.

Now the final draw ratio means the draw ratio of the finally obtained stretched film as compared with that before being stretched, determined based on the total draw ratio and relaxation ratio. For biaxial stretching, it is given by a product of the final MD draw ratio and the final TD draw ratio. The final MD draw ratio means the draw ratio, in the MD direction, of the finally obtainable stretched film as compared with that before being stretched, determined based on MD draw ratio and MD relaxation ratio; and the final TD draw ratio means the draw ratio, in the TD direction, of the finally obtainable stretched film as compared with that before being stretched, determined based on TD draw ratio and TD relaxation ratio, which are calculated based on the equations below:

Final MD draw ratio=(MD Draw ratio−1)×{(100−MD relaxation ratio)/100}+1

Final TD draw ratio=(TD draw ratio−1)×{(100−TD relaxation ratio)/100}+1

The stretched film of this invention may be designed to have a tensile modulus, measured according to JIS K7127, of 2 GPa or larger, may also be 2.5 GPa or larger, and may particularly be 3.0 GPa or larger. Although the upper limit of the tensile modulus is not specifically limited, it may typically be 6 GPa or smaller. Detailed conditions for the tensile modulus follow the description in EXAMPLES later.

The thickness of the stretched film of this invention is preferably 1 μm or larger, more preferably 3 μm or larger, may also be 4 μm or larger, and may particularly be 20 μm or larger. Meanwhile, the thickness of the stretched film of this invention is preferably 100 μm or smaller, more preferably 90 μm or smaller, may also be 80 μm or smaller, and may particularly be 40 μm or smaller.

Although the length of the stretched film of this invention is not specifically limited, it would usually be 10 m or longer when the film is continuously manufactured in a roll-to-roll manner as described later.

The stretched film of this invention preferably has a phosphorus atom concentration of 0.1 to 10 ppm, and more preferably 1 to 8 ppm. Within these ranges, the film will effectively be suppressed from yellowing, and will effectively prevent clogging of a polymer filter, to thereby further improve the continuous productivity.

The stretched film of this invention preferably has an oxygen permeability, at 23° C. and a relative humidity (RH) of 60%, of 1.1 cc·mm/(m²·day·atm) or smaller, more preferably 0.08 cc·mm/(m²·day·atm) or smaller, and may even be 0.05 cc·mm/(m²·day·atm). Although the lower limit is preferably 0 cc·mm/(m²·day·atm), also a level of 0.002 cc·mm/(m²·day·atm) is acceptable enough for practical use.

A method of measurement of oxygen permeability in this invention follows the description in EXAMPLES described later.

Method for Manufacturing Stretched Film

The method for manufacturing a stretched film of this invention is characterized in that the method includes stretching a film composed of a polyamide resin composition, the polyamide resin composition containing 0.5 to 15 parts by weight of a compound represented by Formula (1) per 100 parts by weight of a polyamide resin, the polyamide resin containing a structural unit derived from diamine and a structural unit derived from dicarboxylic acid, 50% by mole or more of the structural unit derived from diamine being derived from xylylenediamine, and 50% by mole or more of the structural unit derived from dicarboxylic acid being derived from a straight-chain aliphatic am-dicarboxylic acid having 4 to 20 carbon atoms.

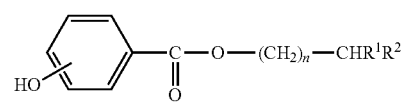

Formula (1)

In Formula (1), $R^1$ represents an alkyl group having 1 to 10 carbon atoms, $R^2$ represents an alkyl group having 2 to 12 carbon atoms, and n represents an integer of 1 to 3.

By blending the compound represented by Formula (1) as described above, the film will become stretchable to a high draw ratio.

Now the polyamide resin (XD-based polyamide resin) and the compound represented by Formula (1) are the same as those described previously, and the same as the preferred ranges.

The method for manufacturing a stretched film of this invention will be explained below, referring to FIG. 1. This invention is of course not limited thereto.

In the method for manufacturing a stretched film of this invention, first, the polyamide resin composition containing 0.5 to 15 parts by weight of compound represented by Formula (1) per 100 parts by weight of the XD-based polyamide resin, kept under melt-kneading, is extruded through a T-die 11 onto a casting roll 12. Extrusion temperature during extrusion is not specifically limited so long as the polyamide resin composition is kept in a molten state. The thickness of the polyamide resin film, composed of the melt-extruded polyamide resin composition, depends on applications and draw ratio, and for example, it is preferably 5 to 60 times larger than that of the stretched film, more preferably 5 to 40 times, even more preferably 10 to 30 times, and particularly 15 to 28 times.

The stretching stress of the unstretched polyamide resin film in this invention may typically be set to 0.24 MPa or larger, may further be 0.26 MPa or larger, and may still further be 0.30 MPa or larger. Although the upper limit of the stretching stress is not specifically limited, it may typically be 5 MPa or smaller, may further be 4 MPa or smaller, and even a level of 1 MPa or smaller is acceptable enough for practical use. The polyamide resin film used in this invention will now have larger stretching stress, and will be stretchable to a high draw ratio.

In the method for manufacturing a stretched film of this invention, the polyamide resin film is stretched. The stretching takes place in a stretching/relaxing zone 13 in FIG. 1.

The stretching may be made only in one direction (monoaxial stretching), or in two orthogonal directions (biaxial stretching). The biaxial stretching is preferable. The film is preferably stretched unidirectionally either in the feeding direction of the polyamide resin film (machine direction, occasionally be referred to as "MD"), or in the width direction of the polyamide resin film (transverse direction, occasionally be referred to as "TD"), more preferably in MD; or, bidirectionally in MD and TD. For the bidirectional stretching, stretching in two directions may take place simultaneously, or sequentially.

In MD stretching, the polyamide resin film may be stretched by allowing it to pass over rolls that rotate at different peripheral speeds. In this case, the roll over which the polyamide resin film travels later is set to have a higher peripheral speed. The film may alternatively be stretched by using a tenter. Meanwhile, TD stretching may be allowed to proceed by using a tenter, or alternatively by using a batch-type biaxial stretching machine.

The polyamide resin film, when stretched monoaxially, is preferably stretched to a draw ratio of 4.2 or larger, preferably 4.4 or larger, even more preferably 4.8 or larger, and particularly 5.0 or larger. The polyamide resin film, when stretched biaxially, is preferably stretched to a draw ratio of 4.2 or larger respectively in both directions, preferably 4.4 or larger, even more preferably 4.8 or larger, and particularly 5.0 or larger. Although the upper limits of the draw ratio in the monoaxial and biaxial stretching processes are not specifically limited, it may typically be set to 20.0 or smaller, may further be 10.0 or smaller, and may still further be 8.0 or smaller.

The total draw ratio in this invention is preferably 18.0 or larger, more preferably 19.0 or larger, even more preferably 20.0 or larger, yet more preferably 22.0 or larger, further preferably 24.0 or larger, and may even be set to 50 or larger. Although the upper limit of the total draw ratio is not specifically limited, it may typically be set to 100.0 or smaller, may further be 40.0 or smaller, and may particularly be 30.0 or smaller. The total draw ratio is the ratio of amount of stretching relative to the unstretched film, and is given by the equation below:

Total draw ratio=MD draw ratio×TD draw ratio

The stretching may be allowed to proceed at normal temperature, but may preferably be allowed to proceed under heating. When allowed to proceed under heating, the polyamide resin film is stretched while being allowed to pass through a heating zone. The stretching is preferably allowed to proceed in the range from a temperature 200° C. lower than the melting point of the XD-based polyamide resin, up to a temperature not exceeding the melting point; more preferably in the range from a temperature 150° C. lower than the melting point of the XD-based polyamide resin up to a temperature 100° C. lower than the melting point; and even more preferably in the range from a temperature 145° C. lower than the melting point of the XD-based polyamide resin up to a temperature 110° C. lower than the melting point.

When two or more species of the XD-based polyamide resins are contained, the temperature of the XD-based polyamide resin during extrusion is preferably determined based on the melting point of the XD-based polyamide resin having the lowest melting point. Also for the case where the XD-based polyamide resin shows two or more melting points, the temperature is preferably determined based on the lowest melting point.

When the stretched film of this invention is used as a laminated film that contains the stretched film and other resin film, the film may be stretched together with such other resin film, which will be detailed later.

In the method for manufacturing a stretched film of this invention, the stretching is preferably followed by heat fixing and relaxation (13 in FIG. 1). The relaxation is preferably effected during the heat fixing. The heat fixed time is preferably 5 seconds to 5 minutes, and more preferably 10 seconds to 1 minute. The relaxation, when effected during the heat fixing that is planned for 30 seconds, may be started typically 15 to 16 seconds after the start of heat fixing.

The heat fixing is preferably allowed to proceed in the range from a temperature 70° C. lower than the melting point of the XD-based polyamide resin, up to a temperature not exceeding the melting point; more preferably in the range from a temperature 50° C. lower than the melting point of the XD-based polyamide resin, up to a temperature 5° C. lower than the melting point; and even more preferably in the range from a temperature 40° C. lower than the melting point of the XD-based polyamide resin, up to a temperature 10° C. lower than the melting point.

The relaxation is preferably allowed to proceed typically by retracting the chuck-to-chuck distance in the direction opposite to the stretching direction.

For the monoaxially stretched polyamide resin film, the relaxation ratio is preferably 0.5 to 10% in the stretching direction, more preferably 1 to 8%, and even more preferably 1.5 to 6%.

For the biaxially stretched polyamide resin film, the relaxation ratio is preferably 0.5 to 10% in the individual directions, more preferably 1 to 8%, and even more preferably 1.5 to 6%.

The relaxation ratio for monoaxial stretching is calculated by the equation below:

Relaxation ratio (%)=(Relaxation amount/Stretching amount)×100

For biaxial stretching, the calculation is as follows:

MD relaxation ratio (%)=(MD relaxation amount/MD stretching amount)×100

TD relaxation ratio (%)=(TD relaxation amount/TD stretching amount)×100

The stretched film obtained by the processes described above is usually stored after wound up into a roll (process 14 in FIG. 1). The stretched film is then cut for use in various applications.

The final draw ratio of the stretched film obtained by the manufacturing method of this invention is preferably adjusted to the above-described final draw ratio of the stretched film, by controlling the stretching amount and the relaxation amount.

Applications of Stretched Film

Figure 2:
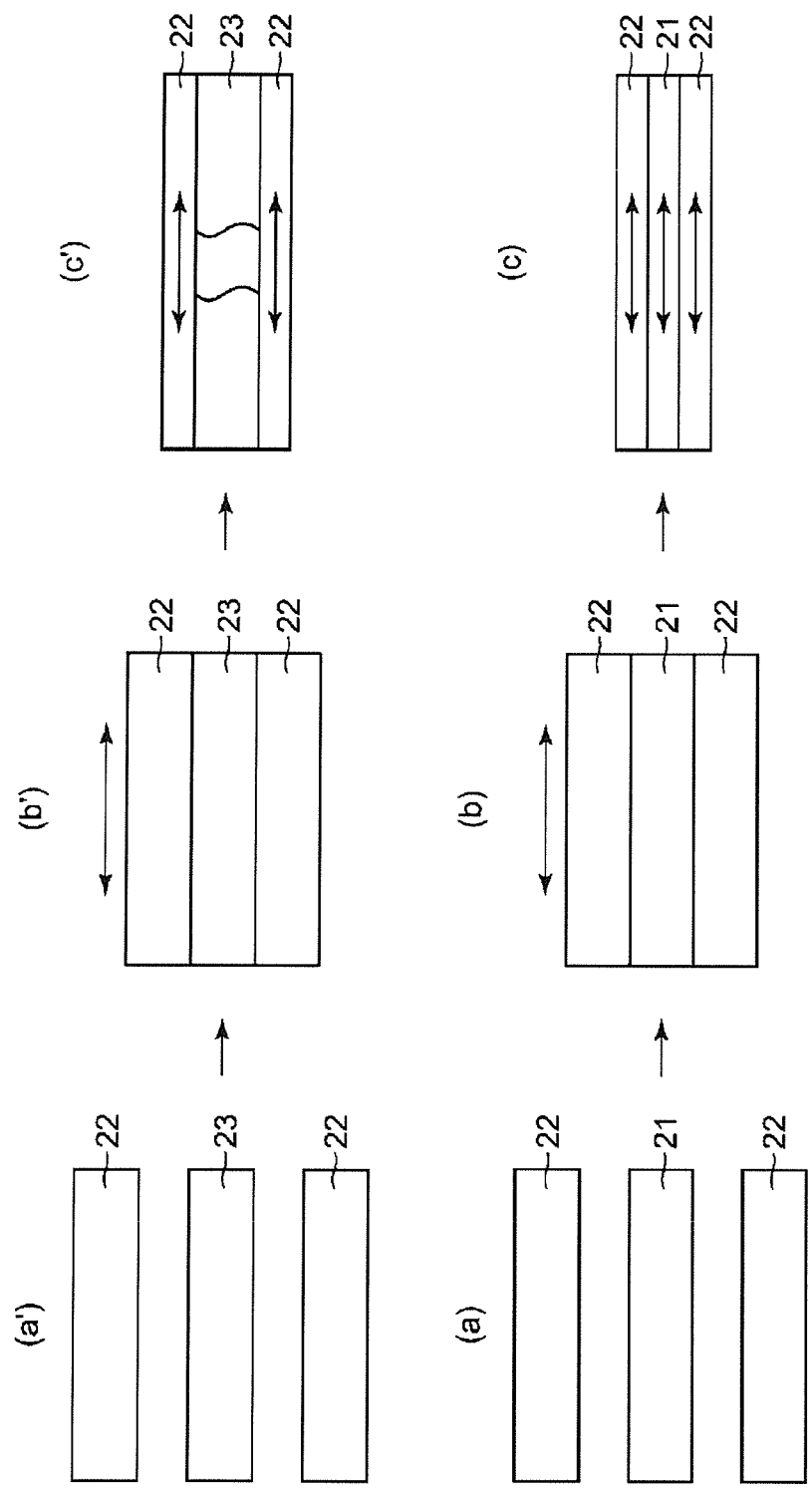
FIG. 2 is a schematic drawing illustrating a process of stretching the stretched film, together with a polypropylene resin film.

The stretched film of this invention may be used in its intact form, but may beneficially be used as a laminated film having a stretched polypropylene resin film. The polypropylene resin film, when stretched, is usually stretched to a high draw ratio. Now as illustrated in FIG. 2, one possible way is to stretch the stretched film of this invention and the polypropylene resin film at the same time. According to a conventional process illustrated in (a') to (c') in FIG. 2, wherein a polyamide resin film 23 is sandwiched by two sheets of polypropylene resin film 22 to form a laminate (a'), and the laminate is stretched (b'), the polyamide resin film 23 may be broken in some cases, posing a difficulty in stretching to a high draw ratio (c'). In contrast, by using the stretched film of this invention illustrated in (a) to (c) in FIG. 2, the stretched film 21 and the polypropylene resin film 22 may easily be stretched at the same time. That is, a preferred embodiment of this invention is exemplified by a method for manufacturing a laminate film, which includes stretching the stretched film of this invention and a polypropylene resin film at the same time. Although the laminate film illustrated in FIG. 2 has two sheets of polypropylene resin film, it may have a single layer, or three or more layers.

Alternatively, the stretched film of this invention and the stretched polypropylene resin film may be prepared separately, and then laminated using an adhesive or the like. Also in this case, the laminate film having the stretched polypropylene resin film has occasionally resulted in breakage of the stretched film due to lack of adaptability. This invention can advantageously avoid such problem.

In this invention, the stretched polypropylene resin film may either be monoaxially stretched or biaxially stretched, and more preferably, biaxially stretched.

The draw ratio of the stretched polypropylene resin preferably falls in a range equivalent to the draw ratio described previously regarding the method for manufacturing a stretched film of this invention.

Besides in the form of the above-described laminate film, the stretched film of this invention may be used in the form of fiber-reinforced composite material after impregnated into a reinforcing fiber. The fiber in this case is exemplified by carbon fiber and glass fiber.

The stretched film of this invention may be used widely for example in automobile parts and other transportation equipment parts, general machinery parts, precision equipment parts, electronic/electric equipment parts, office automation equipment parts, building material/housing equipment parts, medical device, leisure time/sport goods, playing tools, medical supplies, daily goods including food wrapping film, and defense/aerospace products.

EXAMPLES

This invention will further be detailed referring to Examples. Materials, amounts of consumption, ratios, process details and procedures described in Examples below may properly be modified without departing from the spirt of this invention. The scope of this invention is therefore not limited to the specific Examples described below.

<Ingredients>

<<Synthesis of Polyamide Resin MXD6>>

To 8.9 kg of adipic acid, added were 0.3 g of sodium hypophosphite monohydrate and 0.1 g of sodium acetate, the mixture was melted under heating at 170° C. in a reaction can at 0.1 MPaA, the content was kept stirred, 8.3 kg of metaxylylenediamine was slowly added dropwise over two hours, and the temperature was elevated to 250° C. After the temperature was elevated, the pressure was slowly reduced over one hour down to 0.08 MPaA, and kept for 0.5 hours. After completion of the reaction, the content was taken out in the form of strands, pelletized into pellets using a pelletizer, to obtain 15 kg of pellets. The thus obtained pellets were fed into a tumbler (rotary vacuum chamber) equipped with a heating medium jacket, sustainably heated at 200° C. for one hour under reduced pressure (0.5 to 10 Torr) so as to allow the obtained pellets to polymerize in solid phase, to thereby obtain a polyamide resin (MXD6, melting point: 237° C., relative viscosity: 2.65, moisture content: 0.05%).

<<Synthesis of Polyamide Resin MP10>>

To 10.1 kg of sebacic acid, added were 0.3 g of sodium hypophosphite monohydrate and 0.1 g of sodium acetate, the mixture was melted under heating at 170° C. in a reaction can at 0.1 MPaA, the content was kept stirred, 6.7 kg of mixed diamine of metaxylylenediamine and paraxylylenediamine (metaxylylenediamine/paraxylylenediamine=70/30 (% by weight)) was slowly added dropwise over two hours, and the temperature was elevated to 250° C. After the temperature was elevated, the pressure was slowly reduced over one hour down to 0.08 MPaA, and kept for 0.5 hours. After completion of the reaction, the content was taken out in the form of strands, pelletized into pellets using a pelletizer, to obtain 15 kg of pellets. The thus obtained pellets were fed into a tumbler (rotary vacuum chamber) equipped with a heating medium jacket, sustainably heated at 195° C. for one hour under reduced pressure (0.5 to 10 Torr) so as to allow the obtained pellets to polymerize in solid phase, to thereby obtain a polyamide resin (MP10, melting point: 213° C., relative viscosity: 2.60, moisture content: 0.03%).

<<Other Polyamide Resin>>

PA6: UBE Nylon 1024B (from Ube Industries, Ltd.)

<<Plasticizers>>

HD-PB: hexyldecyl p-hydroxybenzoate, Exceparl HD-PB, from Kao Corporation

EH-PB: ethylhexyl p-hydroxybenzoate, obtained from Tokyo Chemical Industry Co., Ltd.

EH-OB: ethylhexyl o-hydroxybenzoate, obtained from Tokyo Chemical Industry Co., Ltd.

BBSA: N-butylbenzene sulfonamide, BM-4, from Daihachi Chemical Industry Co., Ltd.

Example 1

<Method for Manufacturing Stretched Film>

A polyamide resin composition obtained by blending a plasticizer listed in Table 1, according to a ratio listed in Table 1, with 100 parts by weight of a polyamide resin listed in Table 1, was melt-extruded through the die. More specifically, the polyamide resin composition obtained by melt-kneading the individual components was extruded into a film having a thicknesses listed in Table 1, and having a width of 130 mm, and then cut into a 90 mm square. The film was then stretched using a biaxial stretching machine (tenter process, EX105S, from Toyo Seiki Seisaku-sho, Ltd.) respectively in the MD direction and the TD direction, so as to achieve draw ratios summarized in Table 1, and then relaxed while being heat-set at a heat process temperature listed in Table 1, so as to achieve a relaxation ratio listed in Table 1, to thereby obtain a stretched film.

The unstretched film consisting of polyamide resin composition (unstretched films) and the stretched film were evaluated regarding the individual properties, as explained below. Results were summarized in Table 1.

<Measurement of Stretching Stress of Unstretched Film>

Stress applied during stretching was captured by a PC linked type high-performance recorder (THERMO PRO GR3000, from Keyence Corporation) at 0.1 second intervals, and the maximum stress was determined as the stretching stress.

<Measurement of Crystallization Temperature during Heating of Unstretched Film>

Using DSC-60 from Shimadzu Corporation, 5 mg of sample (unstretched film), and nitrogen gas fed as an atmospheric gas at a flow rate of 30 ml/min, the sample was heated at a heating rate of 10° C./min from room temperature (25° C.) up to a temperature not lower than the predicted melting point, and the temperature at which an exothermic peak was observed to reach maximum was defined to be the crystallization temperature of the unstretched film during heating.

<Difference of Crystallization Temperature of Unstretched Film During Heating (Δ Crystallization Temperature During Heating)>

Differences were determined between the crystallization temperatures during heating of the unstretched films in the individual Examples and Comparative Examples, and the crystallization temperatures of the unstretched films manufactured in the same way as in the individual Examples and Comparative Examples except without using the plasticizer.

<Measurement of Melting Point of Unstretched Film>

Using DSC-60 from Shimadzu Corporation, 5 mg of sample (unstretched film), and nitrogen gas fed as an atmospheric gas at a flow rate of 30 ml/min, the sample was heated to melt at a heating rate of 10° C./min from room temperature (25° C.) up to a temperature not lower than the predicted melting point, the sample was rapidly cooled on dry ice, and re-heated up to a temperature not lower than the melting point at a heating rate of 10° C./min, and the temperature at which an endothermic peak was observed to be deepest was defined to be the melting point of the unstretched film.

<Measurement of Phosphorus Atom Concentration of Stretched Film>

To 0.5 g, precisely weighed, of the stretched film, 20 ml of a concentrated sulfuric acid was added, and the mixture was wet-decomposed on a heater. After cooling, the sample was added with 5 ml of hydrogen peroxide, and then concentrated by heating on the heater down to a total volume of 2 to 3 ml. The sample was re-cooled, and diluted with pure water up to 500 ml. The phosphorus atom concentration was quantified by inductively coupled plasma (ICP) atomic emission spectroscopy at 213.618 nm, using IRIS/IP from Thermo Jarrell Ash Corporation.

<Tensile Modulus, Tensile Fracture Strength, and Tensile Fracture Elongation of Stretched Film>

These characteristics were measured according to JIS K7127, using 10 mm wide strips, at a tensile speed of 50 mm/min. In the measurement, the stretched film was pulled in the MD direction, with the chuck-to-chuck distance set to 50 mm.

<Oxygen Permeability of Stretched Film>

The oxygen permeability of the stretched film was measured using an oxygen transmission rate test system (Model: OX-TRAN2/21, from MOCON, Inc.), according to ASTM D3985, under an environment at 23° C. and 60% relative humidity. The smaller the measured value, the better the oxygen barrier performance. For Reference Examples 1 to 3, the unstretched polyamide resin films were measured regarding oxygen permeability in the same way.

Other Examples, Comparative Examples, and Reference Examples

The films were manufactured in the same way as in Example 1, except that the ingredients and manufacturing conditions were altered as listed in Tables 1 or 2. Reference Examples relate to films not stretched.

Results are shown in Tables below.

TABLE 1

| Material | | | Example 1 | Example 2 | Example 3 | Example 4 | Example 5 | Example 6 |
|---|---|---|---|---|---|---|---|---|
| | Polyamide resin | | MXD6 | | | | | |
| | Plasticizer | Types | EH-PB | EH-OB | HD-PB | HD-PB | HD-PB | HD-PB |
| | | Amount of blending (Part by weight) | 1.0 | 1.0 | 1.0 | 5.3 | 0.5 | 10.0 |
| Production process | Thickness of unstreched film | μm | 605 | 610 | 603 | 614 | 613 | 589 |
| | MD draw ratio | Times | 5.07 | 5.07 | 5.07 | 4.56 | 5.07 | 4.56 |
| | TD draw ratio | Times | 5.07 | 5.07 | 5.07 | 4.56 | 5.07 | 4.56 |
| | Total draw ratio | Times | 25.7 | 25.7 | 25.7 | 20.8 | 25.7 | 20.8 |
| | MD relaxation ratio | % | 1.8 | 1.8 | 1.8 | 1.8 | 1.8 | 1.8 |
| | TD relaxation ratio | % | 1.8 | 1.8 | 1.8 | 1.8 | 1.8 | 1.8 |
| | Final MD draw ratio | Times | 5.00 | 5.00 | 5.00 | 4.50 | 5.00 | 4.50 |
| | Final TD draw ratio | Times | 5.00 | 5.00 | 5.00 | 4.50 | 5.00 | 4.50 |
| | Final draw ratio | Times | 25.0 | 25.0 | 25.0 | 20.3 | 25.0 | 20.3 |
| | Stretching temperature | ° C. | 110 | 110 | 110 | 110 | 110 | 110 |
| | Heat fixed temperature | ° C. | 210 | 110 | 210 | 210 | 210 | 210 |
| | Heat fixed time | sec | 30 | 30 | 30 | 30 | 30 | 30 |
| | Stretching stress | MPa | 0.53 | 0.55 | 0.58 | 0.60 | 0.53 | 0.82 |
| | Result of stretching | — | Stretchable | Stretchable | Stretchable | Stretchable | Stretchable | Stretchable |
| Film characteristics before stretching | Crystallization temperature during heating | ° C. | 141 | 141 | 146 | 126 | 147 | 116 |
| | ΔCrystallization temperature during heating | ° C. | −8 | −8 | −3 | −23 | −2 | −33 |
| | Melting point | ° C. | 236 | 236 | 236 | 236 | 236 | 236 |
| Characteristics of stretched film | Phosphorus atom concentration | ppm | 5 | 5 | 5 | 5 | 5 | 5 |
| | Thickness of stretched film | μm | 24.2 | 24.4 | 24.1 | 30.3 | 24.5 | 29.1 |
| | Tensile modulus | GPa | 3.6 | 3.6 | 3.6 | 3.4 | 3.6 | 2.8 |
| | Tensile fracture strength | MPa | 357 | 358 | 362 | 356 | 366 | 301 |
| | Tensile fracture elongation | % | 74 | 75 | 79 | 101 | 76 | 108 |
| | Oxygen permeability (23° C./60% RH) | cc · mm/ (m$^2$ · day · atm) | 0.036 | 0.036 | 0.035 | | 0.033 | 0.58 |

TABLE 1-continued

|  |  |  | Example 7 | Comparative Example 1 | Comparative Example 2 | Comparative Example 3 |
|---|---|---|---|---|---|---|
| Material | Polyamide resin |  | MP10 |  | MXD6 |  |
|  | Plasticizer | Types | HD-PB | None | None | HD-PB |
|  |  | Amount of blending (Part by weight) | 1.0 | 0 | 0 | 25.0 |
| Production process | Thickness of unstreched film | μm | 737 | 498 | 621 | 499 |
|  | MD draw ratio | Times | 7.64 | 4.06 | 4.58 | 4.06 |
|  | TD draw ratio | Times | 7.64 | 4.06 | 4.58 | 4.06 |
|  | Total draw ratio | Times | 58.4 | 16.4 | — | 16.4 |
|  | MD relaxation ratio | % | 1.8 | 1.8 | — | 1.8 |
|  | TD relaxation ratio | % | 1.8 | 1.8 | — | 1.8 |
|  | Final MD draw ratio | Times | 7.50 | 4.00 | — | 4.00 |
|  | Final TD draw ratio | Times | 7.50 | 4.00 | — | 4.00 |
|  | Final draw ratio | Times | 56.3 | 16.0 | — | 16.0 |
|  | Stretching temperature | °C. | 90 | 110 | — | 110 |
|  | Heat fixed temperature | °C. | 190 | 210 | — | 210 |
|  | Heat fixed time | sec | 30 | 30 | — | 30 |
|  | Stretching stress | MPa | 0.65 | 0.23 | — | — |
|  | Result of stretching | — | Stretchable | Stretchable | Broken when stretched | Stretching failure |
| Film characteristics before stretching | Crystallization temperature during Heating | °C. | 101 | 149 | 149 | 122 |
|  | ΔCrystallization temperature during heating | °C. | −3 | 0 | 0 | −27 |
|  | Melting point | °C. | 213 | 237 | 237 | 236 |
| Characteristics of stretched film | Phosphorus atom concentration | ppm | 5 | 5 | 5 | 5 |
|  | Thickness of stretched film | μm | 13.1 | 31.1 | — | — |
|  | Tensile modulus | GPa | 2.5 | 3.4 | — | — |
|  | Tensile fracture strength | MPa | 235 | 354 | — | — |
|  | Tensile fracture elongation | % | 114 | 76 | — | — |
|  | Oxygen permeability (23°C./60% RH) | cc · mm/ (m² · day · atm) | 1.03 | 0.45 | — | — |

TABLE 2

|  |  |  | Comparative Example 4 | Comparative Example 5 | Comparative Example 6 | Comparative Example 7 | Reference Examples 1 |
|---|---|---|---|---|---|---|---|
| Material | Polyamide resin |  | MXD6 | PA6 | MP10 |  | MXD6 |
|  | Plasticizer | Types | BBSA | HD-PB | None |  | None |
|  |  | Amount of blending (Part by weight) | 5.3 | 5.3 | 0 |  | 0 |
| Production process | Thickness of unstreched film | μm | 510 | 483 | 461 | 753 | 103 |
|  | MD draw ratio | Times | 4.06 | 4.06 | 7.13 | 7.64 | — |
|  | TD draw ratio | Times | 4.06 | 4.06 | 7.13 | 7.64 | — |
|  | Total draw ratio | Times | 164 | — | 50.8 | — | — |
|  | MD relaxation ratio | % | 1.8 | — | 1.8 | — | — |
|  | TD relaxation ratio | % | 1.8 | — | 1.8 | — | — |
|  | Final MD draw ratio | Times | 4.00 | — | 7.00 | — | — |
|  | Final TD draw ratio | Times | 4.00 | — | 7.00 | — | — |
|  | Final draw ratio | Times | 16.0 | — | 49.0 | — | — |
|  | Stretching temperature | °C. | 110 | — | 90 | — | — |
|  | Heat fixed temperature | °C. | 210 | — | 190 | — | — |
|  | Heat fixed time | sec | 30 | — | 30 | — | — |
|  | Stretching stress | MPa | — | — | 0.49 | — | — |
|  | Result of stretching | — | Stretching failure | Broken when stretched | Stretchable | Broken when stretched | — |
| Film characteristics before stretching | Crystallization Temperature during Heating | °C. | 142 | 65 | 104 | 104 | 149 |
|  | ΔCrystallization Temperature during Heating | °C. | −7 | −4 | 0 | 0 | 0 |
|  | Melting Point | °C. | 236 | 225 | 213 | 213 | 237 |
| Characteristics of Stretched film (Regarding reference | Phosphorus atom concentration | ppm | 5 | 5 | 5 | 5 | 5 |
|  | Thickness of stretched film | μm | — | — | 9.4 | — | 103 |

TABLE 2-continued

| samples, value of unstretche film are stated) | Tensile modules | GPa | — | — | 2.4 | — | — |
|---|---|---|---|---|---|---|---|
| | Tensile fracture strength | MPa | — | — | 221 | — | — |
| | Tensile fracture elongation | % | — | — | 108 | — | — |
| | Oxygen Permeability (23° C./60% RH) | cc · mm/ (m² · day · atm) | — | — | 1.29 | — | 0.105 |

| | | | Reference Examples 2 | Reference Examples 3 | Reference Examples 4 | Reference Examples 5 |
|---|---|---|---|---|---|---|
| Material | Polyamide resin | | | MXD6 | | MP10 |
| | Plasticizer | Types | HD-PB | HD-PB | HD-PB | None |
| | | Amount of blending (Part by weight) | 1.0 | 5.3 | 10.0 | 0 |
| Production process | Thickness of unstreched film | μm | 102 | 105 | 98 | 101 |
| | MD draw ratio | Times | — | — | — | — |
| | TD draw ratio | Times | — | — | — | — |
| | Total draw ratio | Times | — | — | — | — |
| | MD relaxation ratio | % | — | — | — | — |
| | TD relaxation ratio | % | — | — | — | — |
| | Final MD draw ratio | Times | — | — | — | — |
| | Final TD draw ratio | Times | — | — | — | — |
| | Final draw ratio | Times | — | — | — | — |
| | Stretching temperature | ° C. | — | — | — | — |
| | Heat fixed temperature | ° C. | — | — | — | — |
| | Heat fixed time | sec | — | — | — | — |
| | Stretching stress | MPa | — | — | — | — |
| | Result of stretching | — | — | — | — | — |
| Film characteristics before stretching | Crystallization Temperature during Heating | ° C. | 146 | 126 | 116 | 104 |
| | ΔCrystallization Temperature during Heating | ° C. | −3 | −23 | −33 | 0 |
| | Melting Point | ° C. | 236 | 236 | 236 | 213 |
| Characteristics of Stretched film (Regarding reference samples, value of unstretche film are stated) | Phosphorus atom concentration | ppm | 5 | 5 | 5 | 5 |
| | Thickness of stretched film | μm | 102 | 105 | 98 | 101 |
| | Tensile modules | GPa | — | — | — | — |
| | Tensile fracture strength | MPa | — | — | — | — |
| | Tensile fracture elongation | % | — | — | — | — |
| | Oxygen Permeability (23° C./60% RH) | cc · mm/ (m² · day · atm) | 0.112 | 0.136 | 1.08 | 3.19 |

As is clear from the results summarized above, the stretched films of this invention were found to have high stretching stress, and to be stretchable to high draw ratios (Examples 1 to 7). In contrast, the films without being blended with the compound represented by Formula (1) (Comparative Examples 1, 2, 6, 7) were found to be not stretchable to high draw ratios, as compared with the films derived from the same resin but blended with the compound represented by Formula (1). The films of Comparative Example 2 and Comparative Example 7 were unfortunately broken when forcedly stretched to the draw ratios listed in Table 1. The films blended with an excessive amount of the compound represented by Formula (1) (Comparative Example 3) and the film blended with a plasticizer other than the compound represented by Formula (1) (Comparative Example 4) were found to be stretchable in substance without causing breakage, but were accompanied by stretching failures such as uneven thickness and non-uniform color. The film using a polyamide resin other than the XD polyamide resin (Comparative Example 5) was not stretchable to the draw ratio listed in Table 1, and was unfortunately broken when forcedly stretched.

Meanwhile, for the case of unstretched polyamide resin films of Reference Examples 1 to 5, the oxygen permeability was found to unfortunately increase, when blended with the compound represented by Formula (1). In other words, the oxygen barrier performance degraded. It is usually recognized that blending of plasticizer tends to lower the oxygen barrier performance, and also Reference Examples 1 to 5 found to follow in such tendency. In contrast, as is evident from comparison between Example 3 and Comparative Example 1, oxygen permeability was found to decrease when the polyamide resin film blended with a specific amount of the compound represented by Formula (1) was stretched. It was greatly surprising that the oxygen barrier performance was found to improve due to improved draw ratio, surpassing the decrease in the oxygen barrier performance as a result of blending of the compound represented by Formula (1).

Example 8 Stretching of Multi-Layered Sheet

Polypropylene (Novatec PP FL203D, from Japan Polypropylene Corporation) melted at 240° C. in a single screw extruder, Admer QF580 (PP-based adhesive, from Mitsui Chemicals, Inc.) melted at 240° C. in a single screw extruder, and MXD6 melted at 260° C. in a single screw extruder were fed to a multi-layer film coextruder (temperature of feed block and T-die: 260° C.) for melt extrusion, to thereby obtain a multi-layered film. The layer structure of the film was given as PP/adhesive/MXD6/adhesive/PP=390/10/100/10/390 (μm).

The obtained film was stretched according to the conditions listed in Table 3. It was consequently found that the MXD6 film positioned at the center was stretchable adaptive to the PP film. In particular, this invention was highly beneficial in that it enabled stretching to a draw ratio of 5.0, respectively in the MD direction and in the TD direction.

TABLE 3

| Thickness of Unstretched film | μm | 900 |
|---|---|---|
| MD draw ratio | Times | 5.00 |
| TD draw ratio | Times | 5.00 |
| Total draw ratio | Times | 25.0 |
| MD relaxation ratio | % | — |
| TD relaxation ratio | % | — |
| Final MD draw ratio | Times | 5.00 |
| Final TD draw ratio | Times | 5.00 |
| Final draw ratio | Times | 25.0 |
| Stretching temperature | ° C. | 140 |
| Heat fixed temperature | ° C. | — |
| Heat fixed time | sec | — |
| Stretching stress | MPa | 0.34 |
| Result of Stretching | Times | Stretchable |

REFERENCE SIGNS LIST

11 T-die
12 casting roll
13 stretching/relaxing zone
14 take-up step
21 stretched film
22 polypropylene resin film
23 conventional polyamide resin film

The invention claimed is:

1. A stretched film containing 0.5 to 15 parts by weight of a compound represented by Formula (1) per 100 parts by weight of a polyamide resin,
wherein the polyamide resin is composed of a structural unit derived from diamine and a structural unit derived from dicarboxylic acid;
50% by mole or more of the structural unit derived from diamine is derived from xylylenediamine, and 50% by mole or more of the structural unit derived from dicarboxylic acid is derived from a straight-chain aliphatic am-dicarboxylic acid having 4 to 20 carbon atoms:

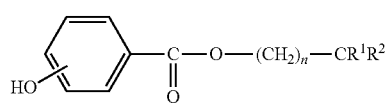

Formula (1)

wherein $R^1$ represents an alkyl group having 1 to 10 carbon atoms, $R^2$ represents an alkyl group having 2 to 12 carbon atoms, and n represents an integer of 1 to 3;
the stretched film has an oxygen permeability, at 23° C. and a relative humidity (RH) of 60%, of 1.1 cc·mm/(m²·day·atm) or smaller; and
wherein the stretched film has the final draw ratio of 20.0 or larger.

2. The stretched film of claim 1, wherein the xylylenediamine comprises 30 to 100% by mole of metaxylylenediamine and 0 to 70% by mole of paraxylylenediamine.

3. The stretched film of claim 1, wherein 50% by mole or more of the structural unit derived from dicarboxylic acid is derived from at least one of sebacic acid and adipic acid.

4. The stretched film of claim 1, wherein 50% by mole or more of the structural unit derived from dicarboxylic acid is derived from adipic acid.

5. The stretched film of claim 1, wherein the stretched film has a phosphorus atom concentration of 0.1 to 10 ppm.

6. The stretched film of claim 1, wherein in the compound represented by Formula (1), $R^1$ represents an alkyl group having 3 to 7 carbon atoms, and $R^2$ represents an alkyl group having 5 to 9 carbon atoms.

7. The stretched film of claim 1, which has a tensile modulus, measured according to JIS K7127, of 2.0 GPa or larger.

8. The stretched film of claim 1, which has a thickness of 1 to 100 μm.

9. A method for manufacturing a stretched film, the method comprising stretching a film consisting of a polyamide resin composition,
wherein the polyamide resin composition contains 0.5 to 15 parts by weight of a compound represented by Formula (1) per 100 parts by weight of a polyamide resin,
the polyamide resin is composed of a structural unit derived from diamine and a structural unit derived from dicarboxylic acid,
50% by mole or more of the structural unit derived from diamine is derived from xylylenediamine, and 50% by mole or more of the structural unit derived from dicarboxylic acid is derived from a straight-chain aliphatic α,ω-dicarboxylic acid having 4 to 20 carbon atoms:

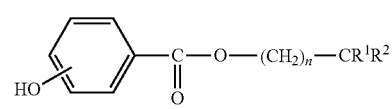

Formula (1)

wherein $R^1$ represents an alkyl group having 1 to 10 carbon atoms, $R^2$ represents an alkyl group having 2 to 12 carbon atoms, and n represents an integer of 1 to 3;
the stretched film has an oxygen permeability, at 23° C. and a relative humidity (RH) of 60%, of 1.1 cc·mm/(m² day atm) or smaller; and
wherein the stretched film has the final draw ratio of 20.0 or larger.

10. The method for manufacturing a stretched film of claim 9, wherein the film is stretched in two orthogonal directions.

11. The method for manufacturing a stretched film of claim 9, wherein the film is stretched in two orthogonal directions respectively to a draw ratio of 20.0 or larger.

12. The method for manufacturing a stretched film of claim 9, wherein the stretching temperature is not lower than (melting point of the polyamide resin −200° C.), and lower than the melting point of the polyamide resin.

13. The stretched film of claim 2, wherein the stretched film has a phosphorus atom concentration of 0.1 to 10 ppm.

14. The stretched film of claim 2, wherein in the compound represented by Formula (1), $R^1$ represents an alkyl group having 3 to 7 carbon atoms, and $R^2$ represents an alkyl group having 5 to 9 carbon atoms.

15. The stretched film of claim 3, wherein the stretched film has a phosphorus atom concentration of 0.1 to 10 ppm.

16. The stretched film of claim 3, wherein in the compound represented by Formula (1), $R^1$ represents an alkyl group having 3 to 7 carbon atoms, and $R^2$ represents an alkyl group having 5 to 9 carbon atoms.

* * * * *